F. C. ATKINSON.
MOISTURE INDICATOR FOR CEREAL PRODUCTS.
APPLICATION FILED DEC. 2, 1913.
1,112,247.
Patented Sept. 29, 1914.
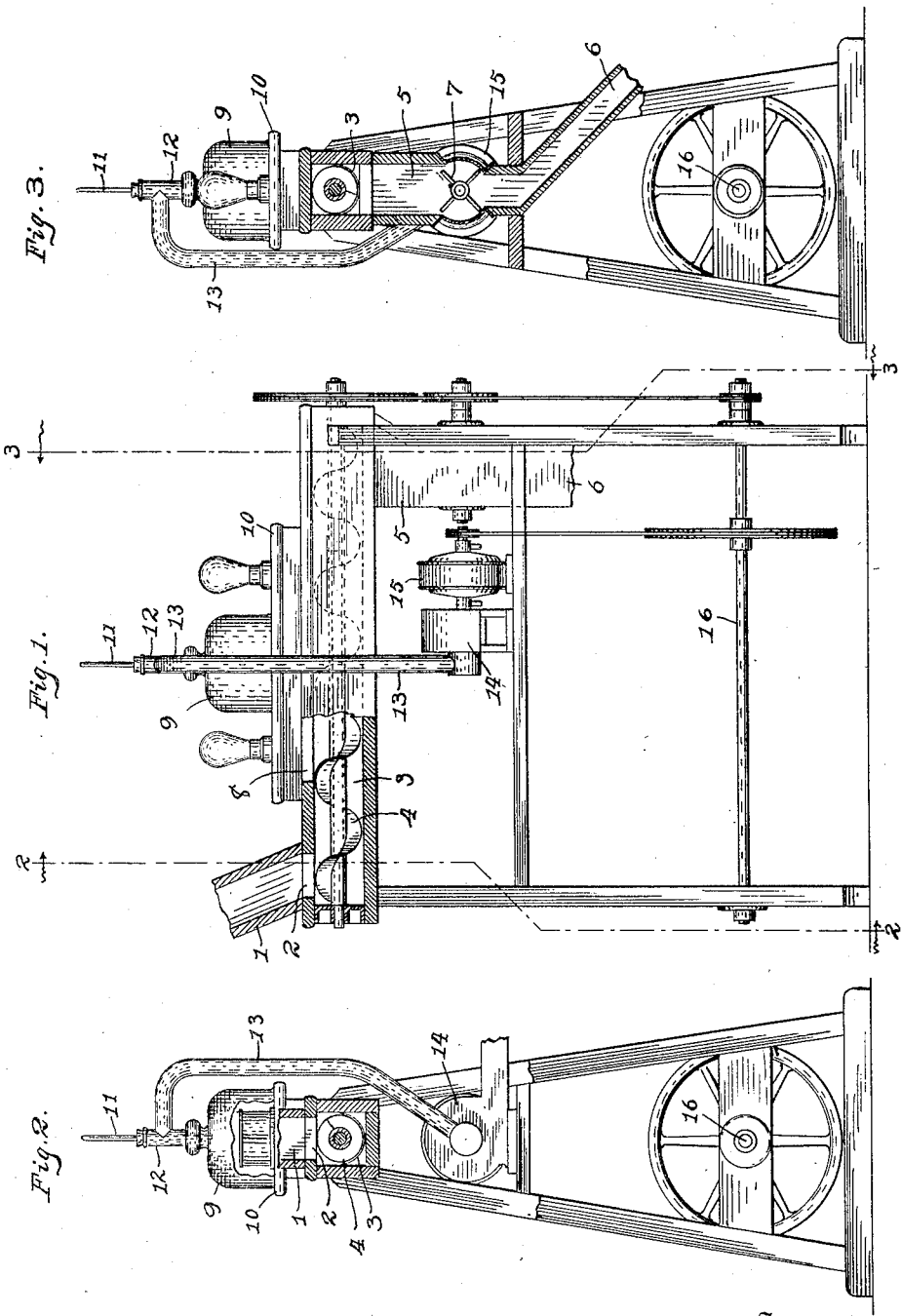

UNITED STATES PATENT OFFICE.

FREDERICK C. ATKINSON, OF INDIANAPOLIS, INDIANA, ASSIGNOR TO AMERICAN HOMINY COMPANY, OF INDIANAPOLIS, INDIANA, A CORPORATION OF NEW JERSEY.

MOISTURE-INDICATOR FOR CEREAL PRODUCTS.

1,112,247.   Specification of Letters Patent.   Patented Sept. 29, 1914.

Application filed December 2, 1913. Serial No. 804,282.

*To all whom it may concern:*

Be it known that I, FREDERICK C. ATKINSON, a citizen of the United States, residing at Indianapolis, Marion county, and State of Indiana, have invented and discovered certain new and useful Improvements in Moisture-Indicators for Cereal Products, of which the following is a specification.

My invention relates to moisture indicators for cereal products and similar material and its object is to provide means whereby the moisture existing in a mass of such material may be readily determined at any time.

With these ends and others in view, my invention is embodied in preferable form in a device hereinafter described and illustrated in the accompanying drawings.

In these drawings, Figure 1 is a side view in elevation, partly broken away and in section, of the preferred form of my invention; Fig. 2 is an end view half in elevation and half in section, the section being taken on the line 2—2 of Fig. 1, and Fig. 3 is an end view of the end opposite to that shown in Fig. 2, half in elevation and half in section, the section being taken on line 3—3 of Fig. 1.

Generally stated, the invention comprises a proper mechanism adapted to draw a very gentle current of air through the feed stuff as it moves along in the conveyer in the mill and means for carrying this current of air which becomes saturated with moisture to a degree corresponding with the moisture contained in the feed stuff, through an air tight vessel in which there is a hygrometer so arranged as to be exposed to the action of this air. The humidity of the air will vary with the percentage of moisture in the feed and by ridding the hygrometer of the humidity and taking into calculation the temperature of the air, this percentage may be obtained. This determination is effected from an arbitrary scale derived from a series of analyses of the feed stuff and a comparison of the humidity of the atmosphere drawn through the feed with the moisture in the feed. The percentage moisture also varies with the temperature of the air due to the fact that an atmosphere of one given temperature and showing a certain humidity will, at a higher temperature or a lower temperature, show a lower humidity or a higher humidity respectively. The arrangement, therefore, includes in connection with the hygrometer, a thermometer over which the air is also drawn, and by having the hygrometer and the thermometer in close proximity the humidity and the temperature can be read at any given time and the moisture in the feed stuff ascertained from the arbitrary scale.

Referring to the drawings, 1 indicates a suitable feed spout to which the material is adapted to be delivered by any suitable means and this feed spout communicates with an opening 2 formed in the upper part of a trough 3, suitably mounted on a frame work and in which trough is mounted a rotatably driven horizontal worm 4 which is adapted to carry the feed stuff from one end of the trough to the other. A trough 3 and a worm 4 constitute conveying means for carrying that portion of the material to be tested, past the indicator. The feed spout is adapted to be substantially filled with the material to be tested in order that the air drawn through the same may be brought into intimate contact with the material so that its moisture may form a correct measure of the moisture in the feed stuff. The worm is adapted to carry the material to the opposite end of the trough which communicates with a vertical chute 5, the lower end of which terminates in an inclined discharge spout 6, which may lead to any suitable point of delivery for the material. In the vertical chute 5 is mounted a rotary valve 7 driven by the belt which also drives the conveyer so that the descending mass of material may be passed through the valve without the upward passage of air.

In communication with the conveyer trough, through an opening 8, is an air tight glass bell jar 9, or similar receptacle, mounted on a suitable support 10 above the trough. This bell jar is adapted to contain a hygrometer of any suitable type whereby the moisture of the air entering the bell jar may be determined. Extending into the bell jar is a thermometer 11, in proximity to the hygrometer and adapted to register the temperature of the air within the bell jar. A pipe 12 extends upwardly from this bell jar and communicates with a descending air conveying pipe 13 which leads to a suitable exhaust fan 14. This fan is adapted to be driven by an electric motor 15 which also serves by suitable driving connections 16 to rotatably drive the shaft of the spiral conveyer and the rotary valve. On the stand 10 on either side of the bell jar is preferably mounted heating means consisting, in the form shown in the drawings, of incandescent electric light bulbs which serve the purpose of warming the bell jar in cold weather when it is found that some of the moisture in the air within the bell jar is being condensed on the walls thereof. If required, in order to accommodate a special form of hygrometer, a box may be substituted for the bell jar and also in very cold weather an inclosing box for the bell jar may be added when the latter is employed.

In the operation of the device the food products being fed to the feed spout 1 are conveyed along the trough 3 by the spiral conveyer 4. The apparatus is closed to the air except at the feed spout, hence the only air drawn in will enter at this point and will thus be carried along in intimate contact with the material. The air thus drawn along or a part thereof will be carried up through the bell jar which is mounted intermediate the ends of the line of feed of the material carried by the conveyer. The air thus entering the bell jar will be carried against the hygrometer and the thermometer and the moisture and temperature indicated, thereby from which indications by means of the arbitrary scale heretofore referred to, the percentage of moisture in the feed stuff may be determined. The air is drawn through the bell jar or similar container by means of the exhaust fan and passes from such fan into the atmosphere. The material tested continues in its path toward the right hand end of the trough and is delivered through the vertical feed chute and the discharge spout into any suitable receptacle therefor.

Having thus described my invention, what I claim is:

1. In a moisture indicator for comminuted products in combination with means for feeding the material from one point to another through an inclosing casing, means in communication with the body of material at a point intermediate the said points of receiving and delivering the material for receiving air carried along with said material, means in said receiving means for indicating the humidity of the air and means for drawing the air through such receiving means, substantially as described.

2. In a moisture indicator for cereal products, in combination with products-conveying means open to the atmosphere only at its receiving end, discharging means in communication with said conveying means and a hygrometer in communication with the conveying means between the receiving and discharging ends of said conveying means, means for inclosing said hygrometer a passageway leading from said hygrometer and a draft inducing means in communication with said passageway, substantially as described.

3. In a moisture indicator for cereal products in combination with a feed spout through which the products and air are admitted, a conveyer in communication with said spout, discharge means in communication with the coveyer, a closed casing in communication with said conveyer and a humidity indicating device and a temperature indicating device in said closed casing, substantially as described.

4. In a moisture indicator for cereal products, in combination with a feed spout to which material is delivered and through which air is admitted, a conveyer, a casing closed against the atmosphere and having means to receive air from said conveyer, a humidity indicating device in said closed casing, a pipe leading from said casing and exhaust means in communication with said pipe, substantially as described.

5. In a moisture indicator for cereal products, in combination with a conveyer means to feed material to said conveyer at one end thereof, means to receive the discharged material from the other end of the conveyer, a humidity indicating device in communication with said conveyer intermediate the ends of the latter and a rotary valve in the discharge means, substantially as described.

In witness whereof, I have hereunto set my hand and seal at Indianapolis, Indiana, this fifteenth day of November, A. D., nineteen hundred and thirteen.

FREDERICK C. ATKINSON. [L. S.]

Witnesses:
A. C. RICE,
H. P. DOOLITTLE.

Copies of this patent may be obtained for five cents each, by addressing the "Commissioner of Patents, Washington, D. C."